July 19, 1938.  J. A. VINCENT  2,124,266
BATTERY CONDITION INDICATOR
Filed May 20, 1936
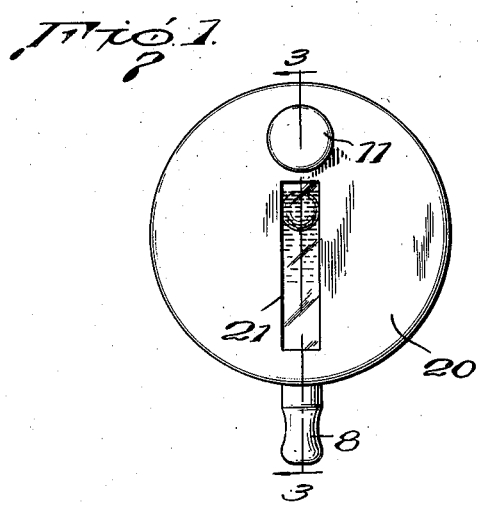
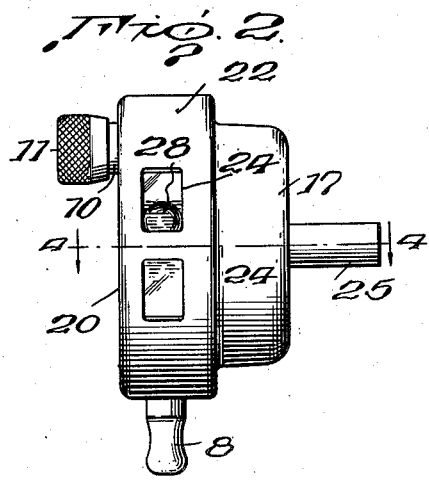
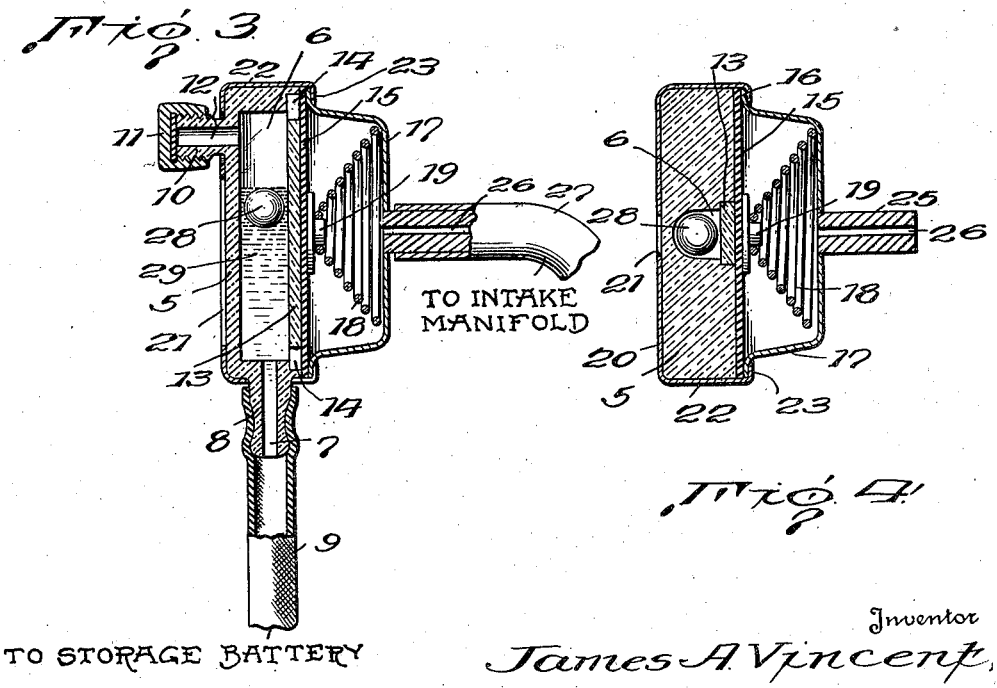
Inventor
James A Vincent,
By A. R. Townshend Jr.
Attorney Patented July 19, 1938

2,124,266

UNITED STATES PATENT OFFICE 2,124,266

BATTERY CONDITION INDICATOR

James A. Vincent, Providence, R. I.

Application May 20, 1936, Serial No. 80,889

7 Claims. (Cl. 265—45)

This invention relates to the art of indicators and is particularly concerned with means for remote indication of the condition and level of the electrolyte liquid in storage batteries of automobiles and the like.

An object of the invention is the provision of a visual indicator for automobile batteries, adapted for dashboard mounting and operably influenced by suction of the intake manifold of the motor.

Another object is the provision of an indicator of such character having self contained means whereby the liquid for the batteries may be supplied directly through the indicator itself. Other objects will be apparent to persons skilled in the art.

The present disclosure constitutes a practical means by which the invention is reduced to practice. It is to be understood that the structural details thereof may be varied and altered as desired in any respects not inconsistent with the scope of the invention as claimed.

Figure 1 of the drawings is a front elevation of the indicator instrument.

Figure 2 is a side elevation thereof.

Figure 3 is a vertical section through the instrument.

Figure 4 is a horizontal section taken on the line 4—4 of Figure 2.

The indicator comprises an instrument adapted to be attached by any suitable mounting upon the instrument board of an automobile. As here shown it consists of a transparent container 5 formed as a substantially cylindrical glass body having flat front and rear faces and provided with a diametrical well 6 open at its lower end through the bore 7 of an integral lateral nipple 8 to a flexible conduit 9 leading to the storage battery cells, not shown. Adjacent the upper end of the well 6 the body 5 is provided with another integral lateral nipple 10 extending from its front face and externally threaded to receive thereover a detachable cap 11 providing a filler closure. A bore 12 through the nipple communicates with the well 6.

Throughout its longitudinal extent the well 6 opens to the rear face of the container body 5 which body, at the ends and side edges of the well, is recessed to seat a light reflecting or color contrast panel strip 13 provided with longitudinal notches 14 at each end and which is suitably secured in its seating recess to constitute a rear wall over the major extent of the well.

A circular flexible diaphragm 15 of flexible material is mounted over the entire rear face of the body 5 completely covering the same and also the panel 13, the diaphragm having a sealed attaching engagement at its rim with the rim of the rear face of the container body. The diaphragm is further secured by the clamping engagement of an annular edge flange 16 of a rearwardly dished suction chamber 17 that also provides a housing for expansion spring means 18 mounted between the rear wall of chamber 17 and a button-head stud 19 secured centrally on the rear face of the diaphragm. A casing 20 is mounted over the front of the container body 5 and is provided with a sight aperture 21 in registry with the well 6. The casing is further provided with a rearwardly extended cylindrical portion 22 having an inturned annular edge flange 23 bent over the edge flange 16 of the suction chamber to clamp same against the diaphragm and container body. The casing portion 22 is formed with a plurality of circumferentially spaced light apertures 24 to illuminate the well 6.

The rear wall of the suction chamber 17 carries an attaching nipple 25 provided with a reduced bore 26 opening to the interior of the chamber. A conduit 27 leading to the engine intake manifold, not shown, is secured over the nipple. The well 6 contains a float of suitable composition and weight to indicate the specific gravity of battery liquid when present in the well.

In service, when the engine of an automobile equipped with the indicator is running, a suction is effected in the suction chamber 17 which draws over the diaphragm against compression of the spring and thus sucks up battery liquid through conduit 9 into the well 6 and the chamber 17 in front of the diaphragm. The notches 14 in the panel strip 13 permit free circulation of the battery liquid which rises in the well giving a sight indication in the sight aperture 21 which, if the proper amount of liquid is in the batteries rises to the level as shown in Figure 1. Also, the float 28 by its position indicates the specific gravity of the liquid 29. When the engine is cut off the spring restores the diaphragm to its initial position as shown in Figure 3 which, with gravity, evacuates the liquid from the well back into the battery conduit 9 and to the battery. If the sight reading indicates a drop in level additional liquid may be supplied through the filler nipple 10.

I claim:—

1. A battery liquid condition indicator comprising a fixed chamber, a flexible diaphragm dividing said chamber into separate non-communicating portions, one portion having a transparent wall and a hydrometer element therein, a battery liquid inlet in free communication with said portion, and means for effecting suction in the other portion behind the diaphragm whereby to flex said diaphragm to draw liquid through said inlet.

2. A battery liquid condition indicator comprising a fixed container for such liquid open through one wall thereof, another wall having a transparent portion, a hydrometer element therein, a battery liquid conduit in open communication with the container, a flexible diaphragm covering the open wall of the container, and means for applying suction to said diaphragm through a wall of the container to flex the diaphragm and increase the capacity of the container.

3. A battery liquid condition indicator comprising a transparent liquid receptacle adapted to receive liquid from a battery, a suction chamber adjacent said receptacle, and a flexible diaphragm providing a common wall between said receptacle and chamber.

4. A liquid condition indicator comprising a receptacle having a transparent wall and a flexible wall, an inlet to said receptacle from a source of liquid to be indicated, and means for applying suction on the outside of said flexible wall whereby to draw liquid from the source into said receptacle for visual inspection through said transparent wall.

5. A battery liquid condition indicator comprising a casing, a liquid receiving chamber therein, a suction chamber therein, a flexible diaphragm separating said chambers, means establishing open communication between a source of battery liquid and the liquid receiving chamber, means for effecting suction in the suction chamber for drawing liquid into the liquid receiving chamber, said liquid receiving chamber having a transparent wall, said casing being apertured for visibility of liquid when in said receiving chamber.

6. A battery liquid condition indicator comprising a casing provided with sight apertures, a transparent receptacle therein and arranged to receive liquid from a source of battery liquid to be inspected, said receptacle opening to the interior of the casing, a flexible diaphragm mounted in said casing and separating same into noncommunicating chambers, means for subjecting one side of said diaphragm to suction whereby to draw liquid into said receptacle in the chamber at the other side, and float means in said receptacle.

7. A battery liquid condition indicator comprising a casing provided with sight apertures, a receptacle therein and having a transparent wall in registry with said apertures, means for applying suction to said casing interior, means therein operable by suction for drawing battery liquid into said receptacle, means in said casing for evacuating the receptacle on cessation of suction, a conduit between the bottom of said receptacle and a source of battery liquid, and a filler inlet in the top of said receptacle for introducing liquid therethrough to the conduit.

JAMES A. VINCENT.